(12) United States Patent
Iwamoto et al.

(10) Patent No.: US 8,736,119 B2
(45) Date of Patent: May 27, 2014

(54) EXTERNAL COVER-COOLED ROTARY ELECTRIC MACHINE AND CASING USED THEREIN

(75) Inventors: Kazuyuki Iwamoto, Minato-ku (JP); Masaya Inoue, Chiyoda-ku (JP); Shinji Nishimura, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 125 days.

(21) Appl. No.: 13/247,668

(22) Filed: Sep. 28, 2011

(65) Prior Publication Data

US 2012/0267969 A1   Oct. 25, 2012

(30) Foreign Application Priority Data

Apr. 21, 2011   (JP) ................. 2011-094746

(51) Int. Cl.
*H02K 9/19* (2006.01)
*H02K 5/20* (2006.01)
*H02K 5/15* (2006.01)

(52) U.S. Cl.
USPC ............ 310/54; 310/58; 310/89; 310/410; 310/413

(58) Field of Classification Search
CPC ........................................ H02K 5/20
USPC ................. 310/54, 89, 52, 58, 59
IPC ............ H02K 009/08, 009/14, 009/16, 009/19
See application file for complete search history.

(56) References Cited

U.S. PATENT DOCUMENTS 2,862,120 A * 11/1958 Onsrud ................. 310/54
6,335,579 B1 * 1/2002 Marioni ................ 310/87
6,963,153 B1   11/2005 Su

FOREIGN PATENT DOCUMENTS

JP   06-269143 B2   9/1994
JP   08149757 A *   6/1996

OTHER PUBLICATIONS

Machine Translation, JP 08149757 A, Jun. 7, 1996.*
Chinese Office Action dated Jan. 6, 2014 issued in corresponding Chinese Patent Application No. 201110365098.7.

* cited by examiner

*Primary Examiner* — John K Kim
*Assistant Examiner* — Thomas Truong
(74) *Attorney, Agent, or Firm* — Sughrue Mion, PLLC

(57) ABSTRACT

A center frame is fastened to a first bracket and a second bracket such that a first mated protrusion and a second mated protrusion are fitted together with a first mated recess portion and a second mated recess portion so as to be mated. O rings are disposed annularly so as to be held between an end surface of the first bracket and a first axial end surface of the center frame, and between an end surface of the second bracket and a second axial end surface of the center frame on an opposite side from outer circumferential inner wall surfaces of the first mated recess portion and the second mated recess portion.

6 Claims, 11 Drawing Sheets

EXTERNAL COVER-COOLED ROTARY ELECTRIC MACHINE AND CASING USED THEREIN

BACKGROUND OF THE INVENTION

1. Field of the Invention

The present invention relates to an external cover-cooled rotary electric machine and a casing that is used therein that allows a refrigerant to flow through an external cover to perform cooling, and particularly relates to a small, lightweight external cover-cooled rotary electric machine that is suitable for use in automobiles and to a casing that is used therein.

2. Description of the Related Art

In the conventional induction motor described in Patent Literature 1, for example, a stator core is held by a stator frame, the stator frame and a front-end end bracket being fitted together so as to be mated and then fastened using bolts, and the stator frame and a rear-end end bracket being fitted together so as to be mated and then fastened using bolts. A zigzag-shaped cooling medium passage is formed inside the stator frame in an axial direction of the electric motor. This cooling medium passage is configured by forming cavities that have openings on an end surface on a side near the front-end end bracket inside the stator frame when the stator frame is cast, and sealing those opening portions using a sealing member.

Patent Literature 1: Japanese Patent Laid-Open No. HEI 6-269143 (Gazette)

In conventional induction motors, because the cooling medium passage is configured by sealing the opening portions of the cavities that are formed on the stator frame using a sealing member, one problem has been that a sealing member is required, increasing the number of parts, and reducing ease of assembly.

Although the stator frame and the end brackets are fitted together so as to be mated, those mated interfitting portions are for positioning parts relative to each other in a radial direction. Because mated interfitting portions for positioning are generally constituted by shallow-based indentations and protrusions, the contribution of the mated interfitting portions to improvements in rigidity of the assemblage of the stator frame and the end brackets is small, making the rigidity of the assemblage insufficient. Thus, another problem has been that the stator frame is deformed due to vibration during movement, etc., and the cooling medium leaks out.

SUMMARY OF THE INVENTION

The present invention aims to solve the above problems and an object of the present invention is to provide an external cover-cooled rotary electric machine and a casing that is used therein that can achieve reductions in the number of parts, improvements in ease of assembly, and increases in rigidity by using an opening portion of a refrigerant passage cavity as a mated recess portion to perform radial positioning among the parts and sealing of the opening portion of the cavity simultaneously.

In order to achieve the above object, according to one aspect of the present invention, there is provided an external cover-cooled rotary electric machine including: a casing including: a first bracket; a second bracket; and a center frame that is held and fastened between end surfaces of the first bracket and the second bracket from two axial ends; a stator including: an annular stator core that is held so as to be fitted into the center frame; and a stator winding that is mounted into the stator core; and a rotor that is rotatably supported by the first bracket and the second bracket, and that is rotatably disposed inside the stator, the external cover-cooled rotary electric machine performing cooling by making a refrigerant flow through the center frame. The center frame is formed into a tubular body that has a cylindrical inner circumferential surface, a first mated recess portion and a second mated recess portion are formed annularly on each of two axial end surfaces of the center frame by a cutting process such that a first inner wall surface that is selected from an inner circumferential inner wall surface and an outer circumferential inner wall surface is formed into a mated surface, a refrigerant passage through which the refrigerant is made to flow is formed inside the center frame so as to have an opening on at least one of the first mated recess portion and the second mated recess portion, and a first mated protrusion and a second mated protrusion are disposed so as to project annularly from respective end surfaces of the first bracket and the second bracket by a cutting process such that a first wall surface that is selected from an inner circumferential wall surface and an outer circumferential wall surface that fits together with the first inner wall surface so as to be mated is formed into a mated surface. The center frame is fastened to the first bracket and the second bracket by the first mated protrusion and the second mated protrusion being fitted together with the first mated recess portion and the second mated recess portion so as to be mated, and an elastic sealing member is disposed annularly on an opposite side of whichever mated recess portion of the first mated recess portion and the second mated recess portion the refrigerant passage has the opening from the first inner wall surface so as to be held between an end surface of the center frame and an end surface of whichever bracket of the first bracket and the second bracket faces the mated recess portion.

According to the present invention, a first inner wall surface that is selected from an inner circumferential inner wall surface and an outer circumferential inner wall surface of first and second mated recess portions and a first wall surface that is selected from an inner circumferential wall surface and an outer circumferential wall surface of first and second mated protrusions are formed by cutting so as to form respective mated surfaces. Because the first and second mated protrusions are fitted together with the first and second mated recess portions so as to be mated, the first inner wall surface and the first wall surface are fitted together so as to be mated without leaving gaps, and function as a seal portion. Thus, axial length of the mated interfitting portions can be made longer, enabling increases in rigidity of the casing.

An opening portion of the refrigerant passage is also closed by the mated protrusion that is fitted together with the mated recess portion so as to be mated. Thus, because the mated protrusion functions as a closing member that closes the opening portion of the refrigerant passage, it is not necessary to prepare sealing members as separate members, reducing the number of parts, and improving assembly.

DETAILED DESCRIPTION OF THE PREFERRED EMBODIMENTS

Preferred embodiments of a rotary electric machine according to the present invention will now be explained using the drawings.

Embodiment 1

Figure 1:
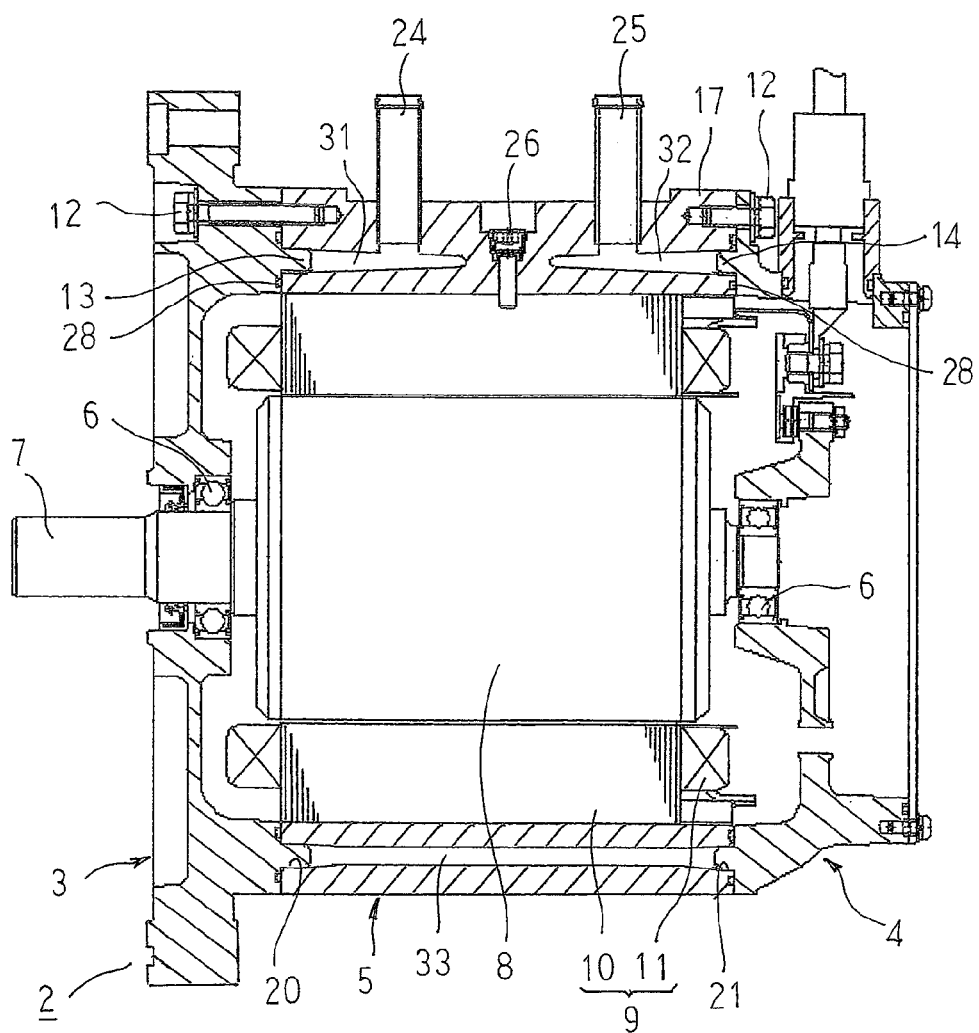
FIG. 1 is a longitudinal cross section that shows an automotive electric motor according to Embodiment 1 of the present invention.
Figure 2:
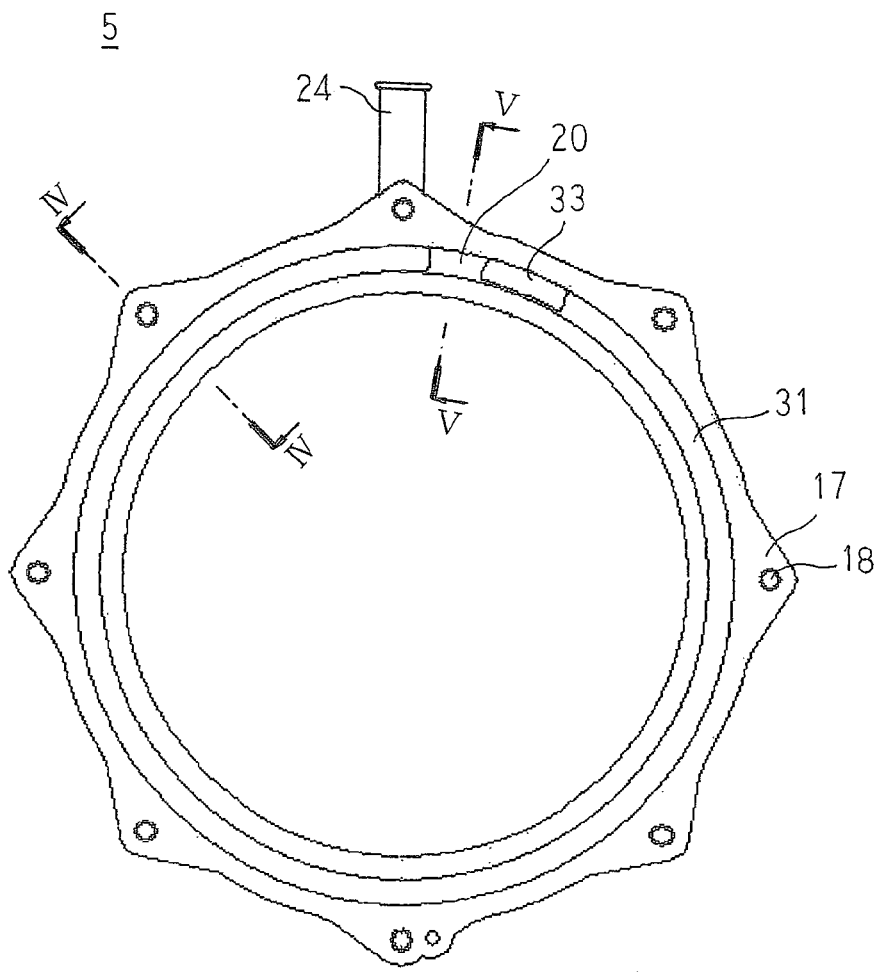
FIG. 2 is an end elevation that shows a center frame that is used in the automotive electric motor according to Embodiment 1 of the present invention.
Figure 3:
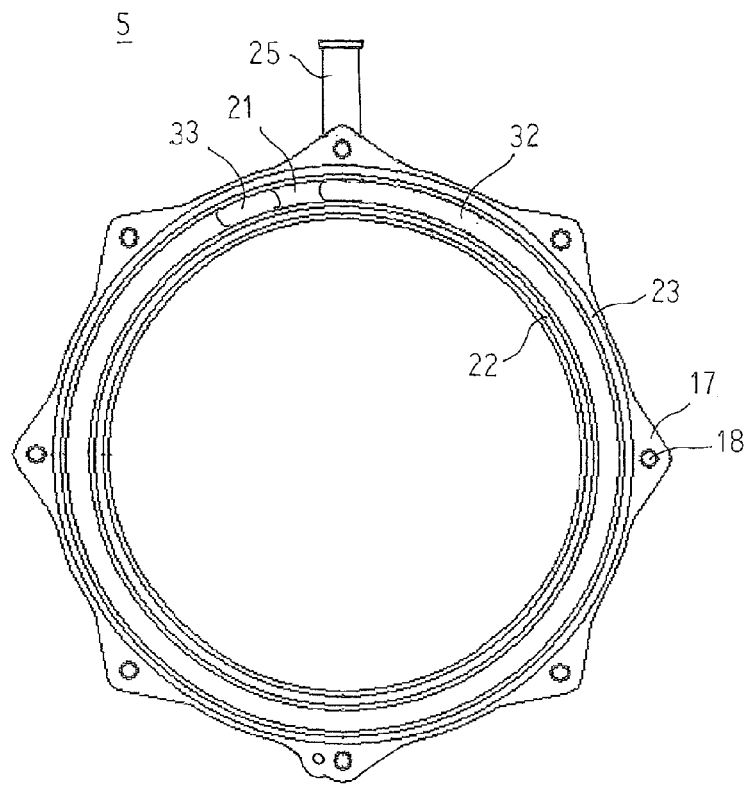
FIG. 3 is an end elevation that shows a center frame that is used in the automotive electric motor according to Embodiment 1 of the present invention.
Figure 4:
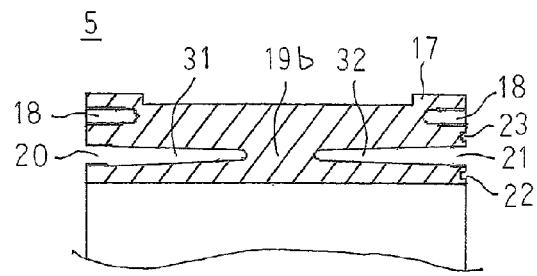
FIG. 4 is a cross section that is taken along Line IV-IV in FIG. 2 so as to be viewed in the direction of the arrows.
Figure 5:
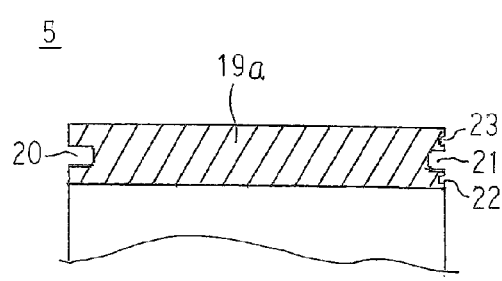
FIG. 5 is a cross section that is taken along Line V-V in FIG. 2 so as to be viewed in the direction of the arrows.
Figure 6:
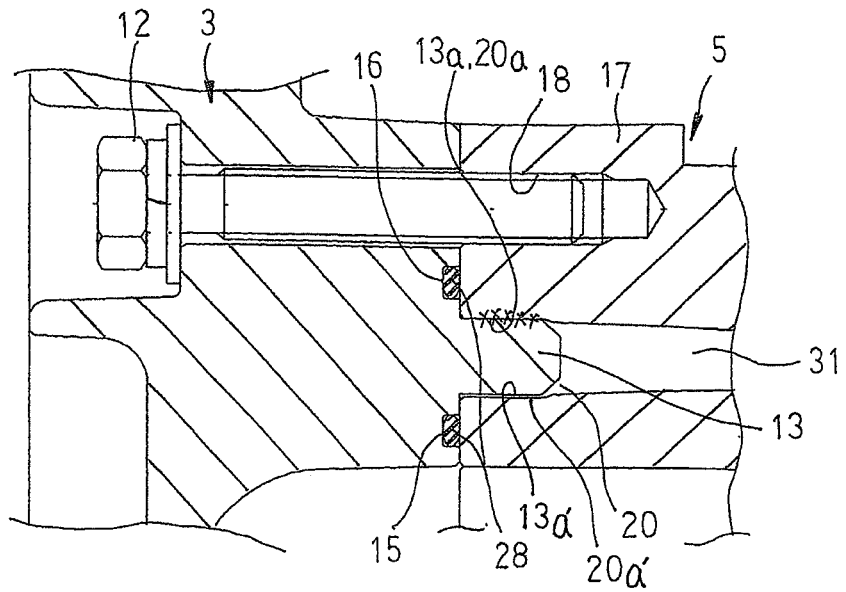
FIG. 6 is a partial cross section that shows an engaged state between a first bracket and the center frame in the automotive electric motor according to Embodiment 1 of the present invention.
Figure 7:
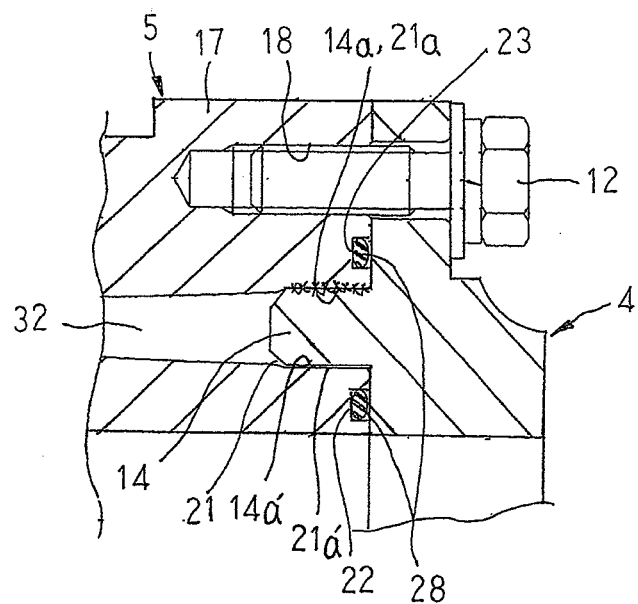
FIG. 7 is a partial cross section that shows an engaged state between a second bracket and the center frame in the automotive electric motor according to Embodiment 1 of the present invention.
Figure 8:
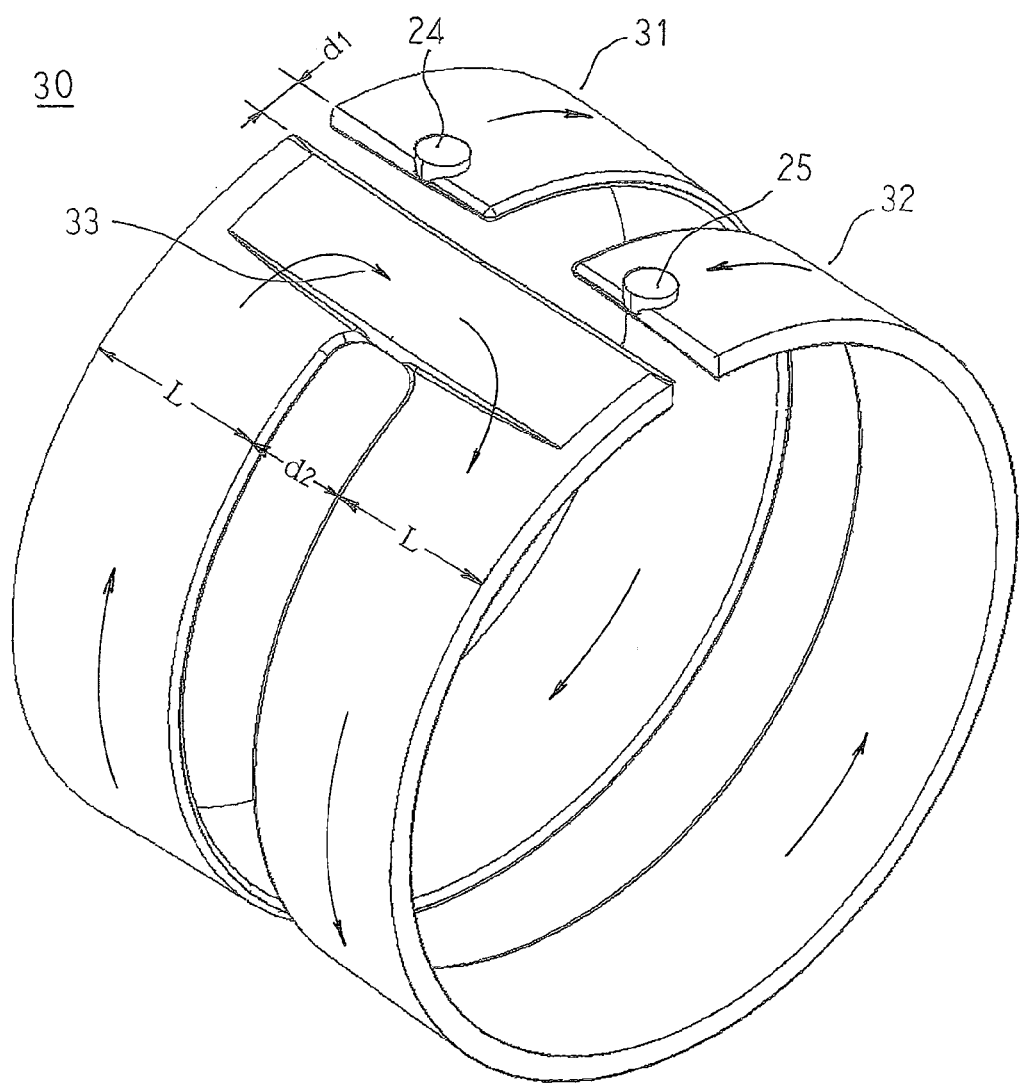
FIG. 8 is a perspective that explains a shape of a refrigerant passage in the automotive electric motor according to Embodiment 1 of the present invention.
Figure 9A:
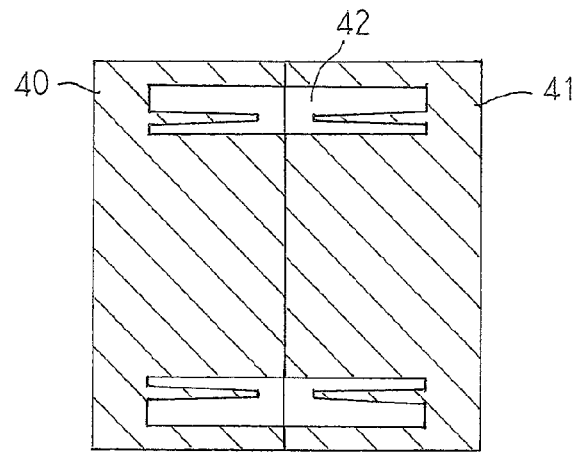
FIGS. 9A through 9C are process cross sections that explain a method for manufacturing the center frame that is used in the automotive electric motor according to Embodiment 1 of the present invention.
Figure 9B:
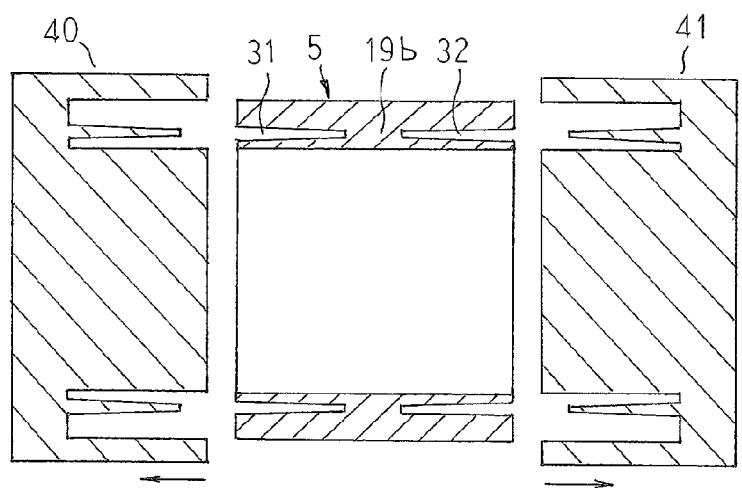
Figure 9C:
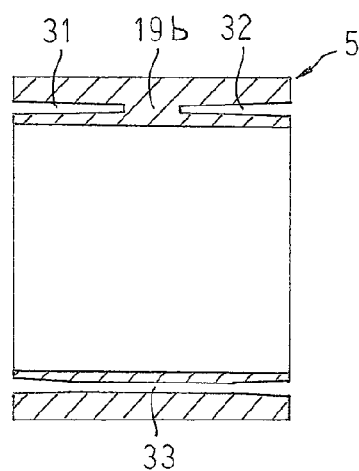
Figure 10A:
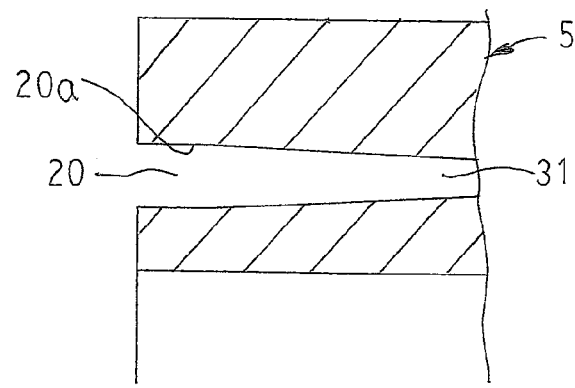
FIGS. 10A through 10C are process cross sections that explain the method for manufacturing the center frame that is used in the automotive electric motor according to Embodiment 1 of the present invention.
Figure 10B:
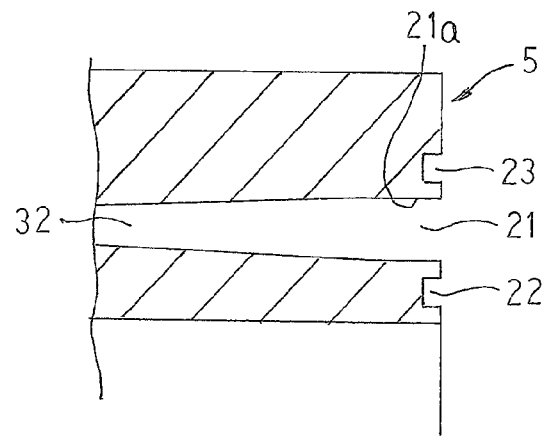
Figure 10C:
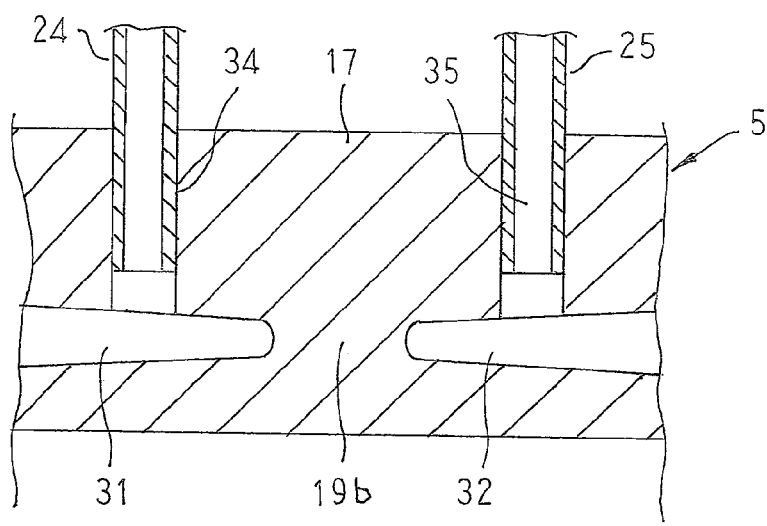

FIG. 1 is a longitudinal cross section that shows an automotive electric motor according to Embodiment 1 of the present invention, FIG. 2 is an end elevation that shows a center frame that is used in the automotive electric motor according to Embodiment 1 of the present invention, FIG. 3 is an end elevation that shows a center frame that is used in the automotive electric motor according to Embodiment 1 of the present invention, FIG. 4 is a cross section that is taken along Line IV-IV in FIG. 2 so as to be viewed in the direction of the arrows, FIG. 5 is a cross section that is taken along Line V-V in FIG. 2 so as to be viewed in the direction of the arrows, FIG. 6 is a partial cross section that shows an engaged state between a first bracket and the center frame in the automotive electric motor according to Embodiment 1 of the present invention, FIG. 7 is a partial cross section that shows an engaged state between a second bracket and the center frame in the automotive electric motor according to Embodiment 1 of the present invention, FIG. 8 is a perspective that explains a shape of a refrigerant passage in the automotive electric motor according to Embodiment 1 of the present invention, FIGS. 9A through 9C are process cross sections that explain a method for manufacturing the center frame that is used in the automotive electric motor according to Embodiment 1 of the present invention, and FIGS. 10A through 10C are process cross sections that explain the method for manufacturing the center frame that is used in the automotive electric motor according to Embodiment 1 of the present invention.

In FIGS. 1 through 7, an automotive electric motor 1 that functions as an external cover-cooled rotary electric machine includes: a motor frame 2 that functions as a casing that is configured by holding a center frame 5 from opposite sides by a first bracket 3 and a second bracket 4 and being fastened using mounting bolts 12; a shaft 7 that is rotatably supported in the first bracket 3 and the second bracket 4 by means of bearings 6; a rotor 8 that is fixed to the shaft 7 and that is disposed inside the motor frame 2; and a stator 9 that has: an annular stator core 10; and a stator winding 11 that is mounted into the stator core 10, the stator core 10 being held so as to be fitted into the center frame 5, and the stator 9 being disposed so as to surround the rotor 8 so as to have a predetermined gap interposed.

The first bracket 3, the second bracket 4, and the center frame 5 are made of aluminum, for example, and are formed by die casting. Facing end surfaces of the first bracket 3 and the second bracket 4 are formed by a cutting process into flat annular surfaces that are perpendicular to an axial direction (an axial direction of the shaft 7). Annular first and second mated projections 13 and 14 that each have a predetermined radial width are disposed by a cutting process so as to project coaxially from the facing end surfaces of the first bracket 3 and the second bracket 4. Outer circumferential wall surfaces 13a and 14a of the first and second mated projections 13 and 14 constitute mated surfaces. Annular seal grooves 15 and 16 are formed on the end surface of the first bracket 3 on opposite sides of the first mated projection 13.

The center frame 5 is formed into a tubular body that has a cylindrical inner circumferential surface. Eight thick rib portions 17 are each disposed so as to project from an outer peripheral surface of the center frame 5 so as to extend axially from a first axial end to a second axial end, and are arranged at a uniform angular pitch circumferentially. Fastening threaded apertures 18 are formed on two end surfaces of the rib portions 17 so as to have aperture directions that are oriented in the axial direction. First and second end surfaces of the center frame 5 are formed into flat annular surfaces that are perpendicular to the axial direction (the axial direction of the shaft 7) by a cutting process. Annular first and second mated recess portions 20 and 21 that each have a predetermined radial width are formed coaxially on the first and second end surfaces of the center frame 5 by a cutting process. In addition, a refrigerant passage 30 is formed inside the center frame 5. Annular seal grooves 22 and 23 are formed on the second end surface of the center frame 5 on opposite sides of the second mated recess portion 21.

As shown in FIG. 8, the refrigerant passage 30 is constituted by: a first passage 31 and a second passage 32 that are formed into respective C shapes that have a predetermined length L in the axial direction and that extend in a first circumferential direction from a position directly below one rib portion 17 to approach a position directly below the rib portion 17 in question, and that are arranged coaxially so as to line up axially; and a communicating passage 33 that communicates between a first end portion of the first passage 31 and a first end portion of the second passage 32. A refrigerant inflow port 24 is mounted to a rib portion 17 of the center frame 5 so as to communicate with a second end portion of the first passage 31, and a refrigerant outflow port 25 is mounted to a rib portion 17 of the center frame 5 so as to communicate with a second end portion of the second passage 32.

Moreover, cavities that constitute the first and second passages 31 and 32 are formed so as to have openings on the first and second mated recess portions 20 and 21, and so as to have cavity shapes in which cross-sectional shapes that include a central axis of the center frame 5 are tapered from the opening ends toward an axial center, in other words, that do not have undercut portions in the axial direction. The first end portions and the second end portions of the first and second passages 31 and 32 are separated by a first partitioning wall portion 19*a* that has a circumferential width d1. The first passage 31 and the second passage 32 are separated by a second partitioning wall portion 19*b* that has an axial width d2.

A method for manufacturing the center frame 5 will now be explained based on FIGS. 9A through 9C and 10A through 10C.

First, as shown in FIG. 9A, a pair of dies 40 and 41 are mounted to a die casting machine (not shown). Then, a molten metal such as aluminum, for example, is injected at high pressure into a cavity 42 that is formed inside the pair of dies 40 and 41. The molten metal hardens, then the pair of dies 40 and 41 are moved axially, as shown in FIG. 9B, to remove the center frame 5. C-shaped first and second passages 31 and 32 that have a circumferential portion that is separated by a first partitioning wall portion 19*a* (not shown) are arranged so as to line up axially on the center frame 5 that is formed so as to have openings on respective end surfaces on opposite sides of the second partitioning wall portion 19*b*. Next, first end portions of the first and second passages 31 and 32 are made to communicate with each other by a cutting process. As shown in FIG. 9C, the first and second passages 31 and 32 are thereby linked by the communicating passage 33 to configure the refrigerant passage 30.

Next, a machining process is applied to a first end surface of the center frame 5 to form a flat annular surface that is perpendicular to the axial direction. Next, a machining process is applied to an opening portion of the first passage 31 and a first end surface of the first partitioning wall portion 19*a* to form the annular first mated recess portion 20 as shown in FIG. 10A. Here, the outer circumferential inner wall surface 20*a* of the first mated recess portion 20 is a reference surface of the machining process, i.e., a mated surface.

Next, a machining process is applied to a second end surface of the center frame 5 to form a flat annular surface that is perpendicular to the axial direction. Next, a machining process is applied to an opening portion of the second passage 32 and a second end surface of the first partitioning wall portion 19*a* to form the annular second mated recess portion 21 as shown in FIG. 10B. In addition, a machining process is applied to the second end surface of the center frame 5 to form annular seal grooves 22 and 23 on an inner circumferential side and an outer circumferential side of the second mated recess portion 21. Here, the outer circumferential inner wall surface 21*a* of the second mated recess portion 21 is a reference surface of the machining process, i.e., a mated surface.

In addition, penetrating apertures 34 and 35 are formed on the center frame 5 from radially outside so as to have openings on second end portions of the first and second passages 31 and 32, as shown in FIG. 10C. Then, the refrigerant inflow port 24 is inserted into the penetrating aperture 34 and is joined to the center frame 5 by welding, etc. The refrigerant outflow port 25 is also inserted into the penetrating aperture 35 and is joined to the center frame 5 by welding, etc.

To assemble the automotive electric motor 1 that is configured in this manner, first the stator 9 is held in the center frame 5 by inserting the stator core 10 inside the center frame 5 by press fitting, etc., and fastening it to the center frame 5 using a fixing bolt 26.

Next, O rings 28 that function as elastic sealing members are mounted into the seal grooves 22 and 23 of the center frame 5, and the second bracket 4 is mounted to the center frame 5 by press-fitting the second mated protrusion 14 into the second mated recess portion 21. Then, the second bracket 4 and the center frame 5 are coupled and integrated by screwing mounting bolts 12 into the threaded apertures 18 and fastening the mounting bolts 12.

Next, a first end of the shaft 7 is inserted into the bearing 6 that is mounted to the second bracket 4. In addition, O rings 28 are mounted into the seal grooves 15 and 16, and the first bracket 3 is mounted onto the center frame 5 by press-fitting the first mated protrusion 13 into the first mated recess portion 20 while inserting a second end of the shaft 7 into the bearing 6 that is mounted to the first bracket 3. Then, the first bracket 3 and the center frame 5 are coupled and integrated by screwing mounting bolts 12 into the threaded apertures 18 and fastening the mounting bolts 12 to assemble the automotive electric motor 1.

When the automotive electric motor 1 is operating, a refrigerant such as cooling water, for example, is made to flow in through the refrigerant inflow port 24 and, as indicated by arrows in FIG. 8, flows through the first passage 31 in the first circumferential direction, flows into the second passage 32 via the communicating passage 33, flows through the second passage 32 in a second circumferential direction, and flows out through the refrigerant outflow port 25. Heat that is generated by the stator 9 is thereby transmitted through the stator core 10 to the center frame 5, and is radiated to the cooling water that flows through the refrigerant passage 30. Frictional heat from the bearings 6 is also transmitted to the first and second brackets 3 and 4, and is radiated through the first and second mated protrusions 13 and 14 to the cooling water that flows through the refrigerant passage 30.

Now, the outer circumferential inner wall surfaces 20*a* and 21*a* of the first and second mated recess portions 20 and 21 and the outer circumferential wall surfaces 13*a* and 14*a* of the first and second mated protrusions 13 and 14 constitute reference surfaces of the machining process (the mated surfaces). Thus, from the viewpoint of dimensional tolerances, it can be assumed that the interfitting portions between the outer circumferential inner wall surfaces 20*a* and 21*a* and the outer circumferential wall surfaces 13*a* and 14*a* have no gaps, and constitute main seal portions on an outer circumferential side of the mated interfitting portions. In addition, the O rings 28 are mounted into the seal grooves 16 and 23 that are formed on outer circumferential sides of the mated interfitting portions, and are disposed in a compressed state between the first and second brackets 3 and 4 and the center frame 5 by the fastening forces from the mounting bolts 12 to constitute auxiliary seal portions on the outer circumferential sides of the mated interfitting portions.

On the other hand, from the viewpoint of dimensional tolerances, it cannot be assumed that the interfitting portions between the inner circumferential inner wall surfaces of the first and second mated recess portions 20 and 21 and the inner circumferential wall surfaces of the first and second mated protrusions 13 and 14 have no gaps, and minute gaps may arise at the interfitting portions in question. Because the gaps at the interfitting portions in question are minute, they constitute auxiliary seal portions on the inner circumferential side of the mated interfitting portions. In addition, the O rings 28 are mounted into the seal grooves 15 and 22 that are formed on the inner circumferential sides of the mated interfitting portions, and are disposed in a compressed state between the first and second brackets 3 and 4 and the center frame 5 by the fastening forces from the mounting bolts 12 to constitute main seal portions on the inner circumferential sides of the mated interfitting portions.

Thus, leakage of the cooling water that flows through the refrigerant passage 30 is prevented by the interfitting portions between the outer circumferential inner wall surfaces 20a and 21a and the outer circumferential wall surfaces 13a and 14a and by the O rings 28 that are disposed in a compressed state on the inner circumferential sides of the mated interfitting portions between the first and second brackets 3 and 4 and the center frame 5. In the unlikely event that the cooling water leaks out through the interfitting portions between the outer circumferential inner wall surfaces 20a and 21a and the outer circumferential wall surfaces 13a and 14a, external leakage of the cooling water that has leaked out is prevented by the O rings 28 that are disposed in a compressed state on the outer circumferential sides of the mated interfitting portions between the first and second brackets 3 and 4 and the center frame 5.

According to Embodiment 1, first and second mated recess portions 20 and 21 are formed in annular shapes on two end surfaces of a center frame 5, and a first passage 31 and a second passage 32 that constitute a refrigerant passage 30 are formed inside the center frame 5 so as to have respective openings at first and second mated recess portions 20 and 21. Then, first and second brackets 3 and 4 are fastened to the center frame 5 by mounting bolts 12 such that annular first and second mated projections 13 and 14 that are disposed so as to protrude from end surface thereof are fitted into the first and second mated recess portions 20 and 21 so as to be mated, to assemble a motor frame 2. In addition, the outer circumferential wall surfaces 13a and 14a of the first and second mated protrusions 13 and 14 and the outer circumferential inner wall surfaces 20a and 21a of the first and second mated recess portions 20 and 21 are mated surfaces, and interfitting portions between the mated surfaces are seal portions.

Thus, because the first and second mated protrusions 13 and 14 that are formed on the first and second brackets 3 and 4 function as sealing members that close the opening portions of the refrigerant passage 30, it is not necessary to prepare sealing members as separate members, enabling the number of parts to be reduced, thereby enabling assembly to be improved.

Because a sealing function is imparted to the interfitting portions between the first and second mated protrusions 13 and 14 and the first and second mated recess portions 20 and 21, axial length of the mated interfitting surfaces can be lengthened. Thus, rigidity of the motor frame 2, which is an assemblage of the center frame 5 and the first and second brackets 3 and 4, can be increased. As a result, deformation of the center frame 5 due to vibration during movement, etc., can be suppressed, enabling the occurrence of leakage of refrigerant that results from deformation of the center frame 5 to be suppressed.

Because the refrigerant passage 30 is formed so as to have a flow channel shape that does not have an undercut portion in the axial direction, chaplets are no longer required when manufacturing the center frame 5, improving mass producibility of the center frame 5.

The refrigerant passage 30 is constituted by: a first passage 31 and a second passage 32 that are respectively formed into C shapes that are separated circumferentially by a first partitioning wall portion 19a, and are arranged so as to line up axially so as to be separated axially by a second partitioning wall portion 19b; and a communicating passage 33 that communicates axially between the end portions of the first passage 31 and the second passage 32.

Thus, because the flow of the refrigerant as it flows through the second passage 32 and the flow of the refrigerant as it flows through the first passage 31 are in opposite directions, the temperature gradient of the refrigerant as it flows through the first passage 31 from the refrigerant inflow port 24 toward the communicating passage 33 and the temperature gradient of the refrigerant as it flows through the second passage 32 from the communicating passage 33 toward the refrigerant outflow port 25 are reverse gradients. Thus, refrigerant temperature can be made circumferentially uniform, increasing cooling efficiency.

Because the refrigerant inflow port 24 and the refrigerant outflow port 25 are disposed so as to line up circumferentially in close proximity axially, connection to cooling system piping of an automotive vehicle is simplified.

Furthermore, there is only one turnaround portion in the flow channel in the refrigerant passage 30, i.e., at the communicating passage, reducing pressure loss in the flow channel, thereby reducing mechanical power required to circulate the refrigerant.

Because the second partitioning wall portion 19b is formed on an axially central portion of the center frame 5 so as to have an approximate ring shape, rigidity of the center frame 5 is increased. Thus, deformation of the center frame 5 due to press-fitting or shrinkage fitting of the stator core 10 can be suppressed.

Because the thick rib portions 17 are arranged at a uniform angular pitch in a circumferential direction, rigidity of the center frame 5 is made uniform in the circumferential direction. Thus, circumferential distribution of the stresses that arise in the center frame 5 when the stator core 10 is press-fitted or fitted by shrinkage into the center frame 5 is made uniform, enabling local occurrences of cogging torque and core loss to be suppressed. In addition, because axially central portions of the rib portions 17 that are arranged at a uniform angular pitch circumferentially are linked circumferentially by the second partitioning wall portion 19b, rigidity of the center frame 5 is further increased.

Because the mounting bolts 12 are fastened to the rib portions 17, fastening force is increased, enabling vibration resistance to be improved.

The first passage 31 and the second passage 32 have cavity shapes that do not have undercut portions. Thus, a machining blade that cuts the communicating passage 33 can be easily inserted into the first passage 31 or the second passage 32, simplifying the formation of the communicating passage 33. Similarly, a machining blade that cuts the first and second mated recess portions 20 and 21 can be easily inserted into the first passage 31 and the second passage 32, simplifying the formation of the first and second mated recess portions 20 and 21.

Moreover, in Embodiment 1 above, a first passage and a second passage are shaped so as not to have undercut portions in an axial direction, and are formed integrally by die casting and then a communicating passage is formed by a cutting process, but the communicating passage may also be shaped so as not to have an undercut portion in the axial direction in addition to the first passage and the second passage, and these passages may be formed integrally by die casting.

In Embodiment 1 above, outer circumferential wall surfaces 13a and 14a of first and second mated protrusions 13 and 14 and outer circumferential inner wall surfaces 20a and 21a of first and second mated recess portions 20 and 21 are formed as mated surfaces, but inner circumferential wall surfaces 13a' and 14a' of first and second mated protrusions 13 and 14 and inner circumferential inner wall surfaces 20*a*' and 21*a*' of first and second mated recess portions 20 and 21 may instead be formed as mated surfaces. In that case, elastic sealing portions formed by O rings on an outer circumferential side of the mated interfitting portions become a requisite configuration, and elastic sealing portions formed by inner circumferential O rings constitute auxiliary seal portions.

In Embodiment 1 above, the refrigerant flows from the first passage through the communicating passage to the second passage, but the refrigerant may also be made to flow from the second passage through the communicating passage to the first passage.

Embodiment 2

Figure 11:
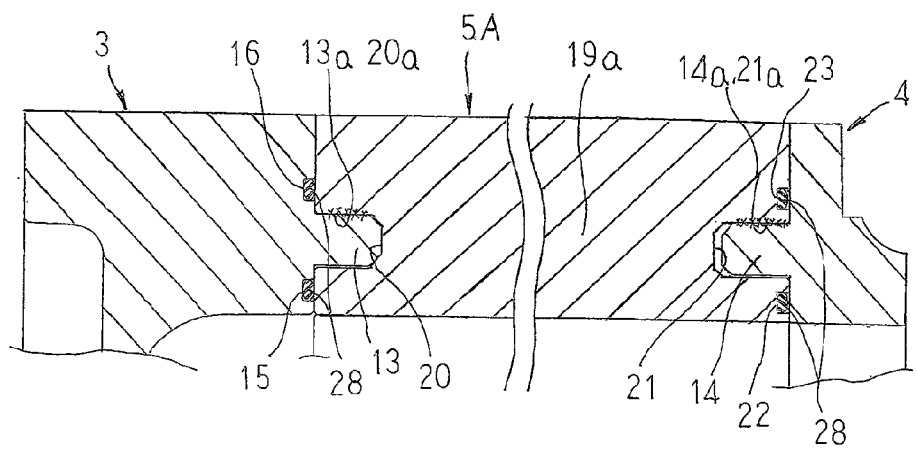
FIG. 11 is a partial cross section of a center frame that is used in an automotive electric motor according to Embodiment 2 of the present invention.
Figure 12:
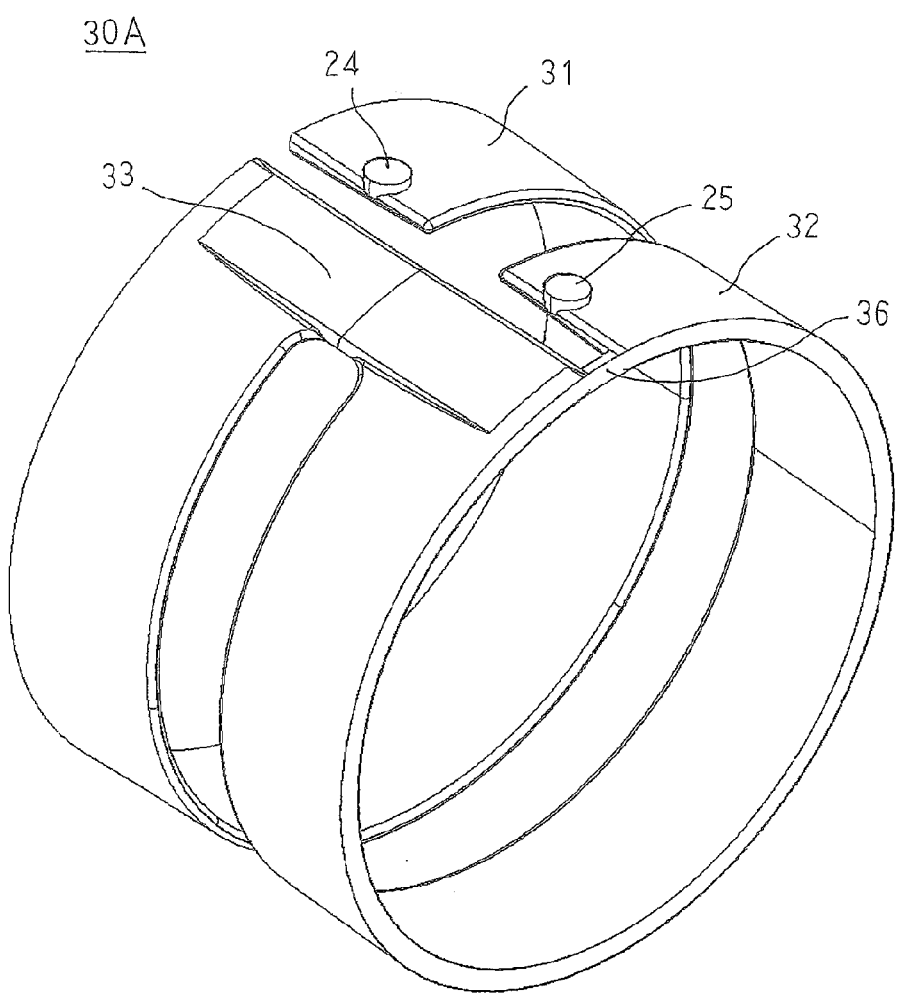
FIG. 12 is a perspective that explains a shape of a refrigerant passage in the automotive electric motor according to Embodiment 2 of the present invention.

FIG. 11 is a partial cross section of a center frame that is used in an automotive electric motor according to Embodiment 2 of the present invention, and FIG. 12 is a perspective that explains a shape of a refrigerant passage in the automotive electric motor according to Embodiment 2 of the present invention.

In FIGS. 11 and 12, depth of a mated recess portion 21 of a first partitioning wall portion 19*a* of a center frame 5A is made deeper than an amount of projection of a mated protrusion 14 from an end surface of a second bracket 4 to form a minute gap between the mated protrusion 14 and a bottom surface of the mated recess portion 21. Thus, a refrigerant passage 30A has a bypass passage 36 that communicates between a starting end portion and a finishing end portion of a second passage 32.

Moreover, the rest of the configuration is configured in a similar manner to Embodiment 1 above.

An automotive electric motor in which a center frame 5A that is configured in this manner is installed is mounted to a vehicle such that the first partitioning wall portion 19*a* of the center frame 5A is positioned vertically upward.

Thus, if air flows from the refrigerant inflow port 24 into the first passage 31 together with the refrigerant, the air flows through the first passage 31 together with the refrigerant, and reaches a first end portion of the first passage 31. Then, the air flows along a wall surface near the first partitioning wall portion 19*a* of the communicating passage 33 toward the second passage 32 due to the flow of the refrigerant that flows through the communicating passage 33 toward the second passage 32. Then, the air passes through the bypass passage 36 and flows into a second end portion of the second passage 32, and is discharged through the refrigerant outflow port 25 together with the refrigerant that has flowed through the second passage 32.

According to Embodiment 2, because a bypass passage 36 that communicates between end portions of the second passage 32 is included, air that has flowed into the refrigerant passage 30A can be discharged effectively, enabling the amount of air remaining inside the refrigerant passage 30A to be reduced. Thus, decreases in heat exchange performance that result from air remaining inside the refrigerant passage 30A can be suppressed. Because air that has flowed into the refrigerant passage 30A can be discharged continuously, situations in which operation of a refrigerant circulating pump is disabled due to air that remains in large amounts being discharged through the refrigerant outflow port 25 and entering the refrigerant circulating pump can be preempted.

If an air bleeding valve is installed, valve opening and closing operations are required every time the refrigerant is replaced. However, the valve opening and closing operations must be performed in a confined space in which the automotive electric motor is mounted, making them extremely complicated operations. In Embodiment 2, because air that has flowed into the refrigerant passage 30A can be discharged automatically, it is not necessary to install an air bleeding valve, enabling the complicated valve opening and closing operations to be eliminated.

Embodiment 3

Figure 13:
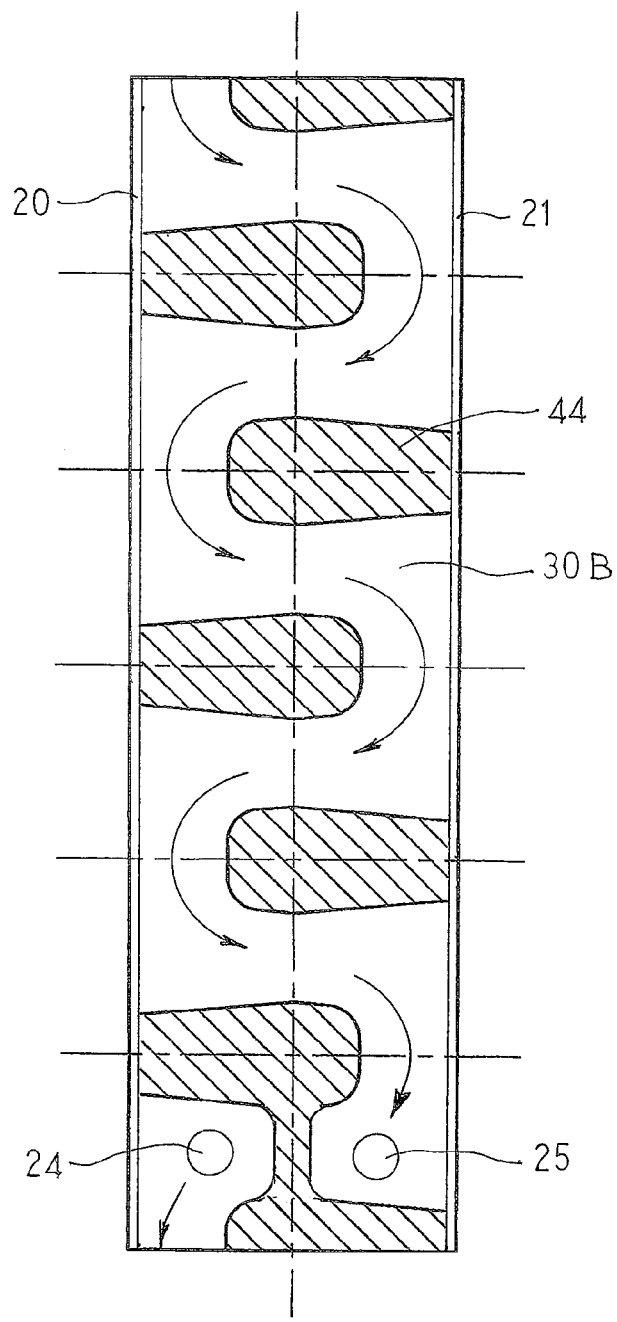
FIG. 13 is a developed projection that explains a shape of a refrigerant passage in an automotive electric motor according to Embodiment 3 of the present invention.
Figure 14:
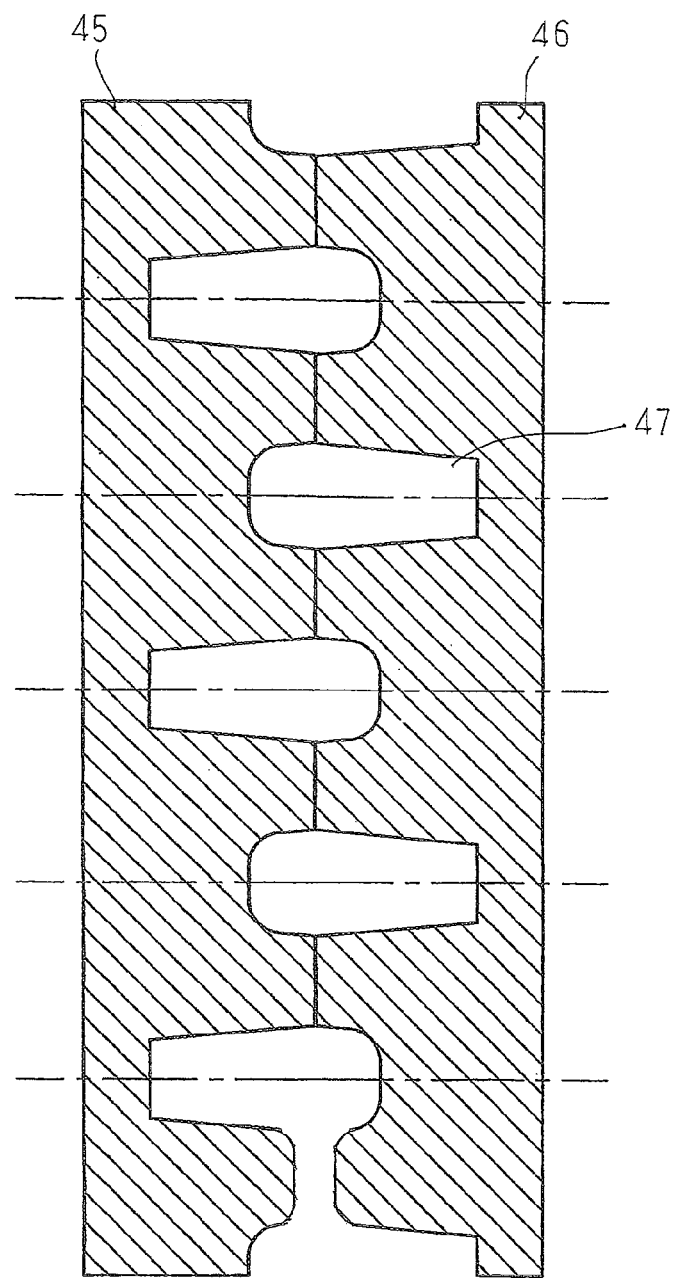
FIG. 14 is a cross section that explains a die setting state in a method for manufacturing a center frame that is used in the automotive electric motor according to Embodiment 3 of the present invention.
Figure 15:
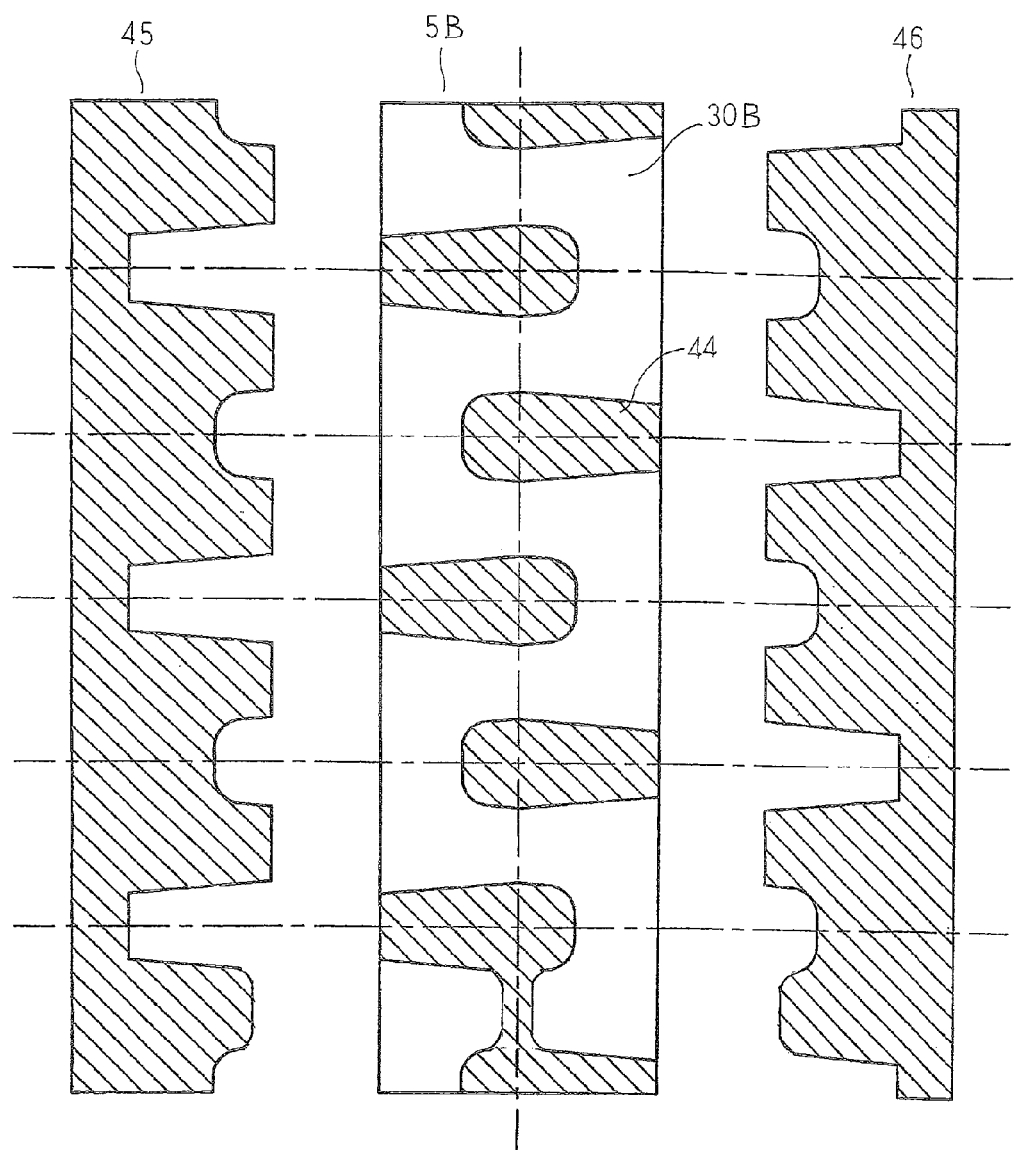
FIG. 15 is a cross section that explains the method for manufacturing the center frame that is used in the automotive electric motor according to Embodiment 3 of the present invention.

FIG. 13 is a developed projection that explains a shape of a refrigerant passage in an automotive electric motor according to Embodiment 3 of the present invention, FIG. 14 is a cross section that explains a die setting state in a method for manufacturing a center frame that is used in the automotive electric motor according to Embodiment 3 of the present invention, and FIG. 15 is a cross section that explains the method for manufacturing the center frame that is used in the automotive electric motor according to Embodiment 3 of the present invention. Moreover, FIG. 13 represents a state in which a center frame is cut open in a plane that includes a central axis and is spread out flat, FIG. 14 represents a state in which dies are cut open in a plane that includes a central axis and are spread out flat, and FIG. 15 represents a state in which the center frame and the dies are cut open in a plane that includes a central axis and are spread out flat. In FIG. 13, arrows represent refrigerant flow.

In FIG. 13, a refrigerant passage 30B is formed inside a center frame 5B so as to have openings on first and second mated recess portions 20 and 21 that are formed in annular shapes on two end surfaces of the center frame 5B, and is formed into an axially zigzag-shaped flow channel by a plurality of partitioning wall portions 44.

Moreover, the rest of the configuration is configured in a similar manner to Embodiment 1 above.

A method for manufacturing the center frame 5B will now be explained based on FIGS. 14 and 15.

First, a pair of dies 45 and 46 are mounted to a die casting machine (not shown). Then, as shown in FIG. 14, a molten metal such as aluminum, for example, is injected at high pressure into the cavity 47 that is formed inside the pair of dies 45 and 46. After the molten metal hardens, the pair of dies 45 and 46 are moved axially to remove the center frame 5B, as shown in FIG. 15. The axially zigzag-shaped refrigerant passage 30B is formed by partitioning wall portions 44 inside the center frame 5B that is formed, and has openings on two end surfaces.

Next, a machining process is applied to two end surfaces of the center frame 5B to form flat annular surfaces that are perpendicular to the axial direction. In addition, a machining process is applied to an opening portion of the refrigerant passage 30B and an end surface of the partitioning wall portion 44 to form the annular first and second mated recess portions 20 and 21. A machining process is also applied to an end surface of the center frame 5B to form annular seal grooves 22 and 23 on an inner circumferential side and an outer circumferential side of the second mated recess portion 21. A refrigerant inflow port 24, a refrigerant outflow port 25, threaded apertures 18, etc., are also formed on the center frame 5B.

Although not shown, a center frame 5B that is prepared in this manner is coupled to and integrated with the second bracket 4 by mounting O rings 28 into the seal grooves 22 and 23, press-fitting the second mated protrusion 14 into the second mated recess portion 21, screwing the mounting bolts 12 into the threaded apertures 18, and fastening the mounting bolts 12. The center frame 5B is also coupled to and integrated with the first bracket 3 by mounting O rings 28 into the seal grooves 15 and 16, press-fitting the first mated protrusion 13 into the first mated recess portion 20, screwing the mounting bolts 12 into the threaded apertures 18, and fastening the mounting bolts 12.

The opening portions of the refrigerant passage 30B at the two ends of the center frame 5B are thereby closed by the mated fittings between the first and second mated protrusions 13 and 14 and the first and second mated recess portions 20 and 21 to configure the axially zigzag-shaped flow channel. Thus, as indicated by the arrows in FIG. 13, the refrigerant flows from the refrigerant inflow port 24 into the refrigerant passage 30B, flows through the refrigerant passage 30B, absorbs heat that is generated in the stator 9, and is then discharged through the refrigerant outflow port 25.

In Embodiment 3, because the first and second mated protrusions 13 and 14 function as sealing members that close the opening portions of the refrigerant passage 30B, it is not necessary to prepare sealing members as separate members, also enabling the number of parts to be reduced, thereby enabling assembly to be improved.

Because a sealing function is imparted to the interfitting portions between the first and second mated protrusions 13 and 14 and the first and second mated recess portions 20 and 21, motor frame rigidity can be increased. As a result deformation of the center frame 5B due to vibration during movement, etc., can be suppressed, enabling the occurrence of leakage of refrigerant that results from deformation of the center frame 5B to be suppressed.

Because the refrigerant passage 30B is formed so as to have a flow channel shape that does not have an undercut portion in the axial direction, chaplets are no longer required when manufacturing the center frame 5B, improving mass producibility of the center frame 5B.

Moreover, in each of the above embodiments, explanations are given for automotive electric motors, but the present invention is not limited to automotive electric motors, and similar effects are also exhibited if the present invention is applied to external cover-cooled rotary electric machines such as automotive alternators, automotive generator-motors, etc.

In each of the above embodiments, O rings are used as the elastic sealing members, but the elastic sealing members need only be able to be elastically deformed by the fastening forces from the mounting bolts to accomplish a sealing function, and ring-shaped rubber sheets can also be used, for example.

In each of the above embodiments, seal grooves are formed on an end surface of a first bracket, but may also be formed on an end surface of the center frame near the first bracket. Seal grooves are similarly formed on an end surface of the center frame near a second bracket, but may also be formed on an end surface of the second bracket.

In each of the above embodiments, a refrigerant passage has openings on two end surfaces of a center frame, but the refrigerant passage need only have an opening on at least one end surface of the center frame.

In each of the above embodiments, a refrigerant passage is formed so as to have a cavity shape that does not have an undercut portion in an axial direction, but the refrigerant passage may also have a cavity shape that has an undercut portion if the opening portion of the refrigerant passage is made into the mated recess portion.

What is claimed is:

1. An external cover-cooled rotary electric machine comprising:
   a casing comprising:
   a first bracket;
   a second bracket; and
   a center frame that is held and fastened between end surfaces of said first bracket and said second bracket from two axial ends;
   a stator comprising:
   an annular stator core that is held so as to be fitted into said center frame; and a stator winding that is mounted into said stator core; and
   a rotor that is rotatably supported by said first bracket and said second bracket, and that is rotatably disposed inside said stator,
   said external cover-cooled rotary electric machine performing cooling by making a refrigerant flow through said center frame, wherein:
   said center frame is formed into a tubular body that has a cylindrical inner circumferential surface;
   a first mated recess portion and a second mated recess portion are formed annularly on each of two axial end surfaces of said center frame by a cutting process such that a first inner wall surface that is selected from an inner circumferential inner wall surface and an outer circumferential inner wall surface is formed into a mated surface;
   a refrigerant passage through which said refrigerant is made to flow annularly along the center frame is formed inside said center frame so as to have an opening on at least one of said first mated recess portion and said second mated recess portion;
   a first mated protrusion and a second mated protrusion are disposed so as to project annularly from respective end surfaces of said first bracket and said second bracket by a cutting process such that a first wall surface that is selected from an inner circumferential wall surface and an outer circumferential wall surface that fits together with said first inner wall surface so as to be mated is formed into a mated surface;
   said center frame is fastened to said first bracket and said second bracket by said first mated protrusion and said second mated protrusion being fitted together with said first mated recess portion and said second mated recess portion so as to be mated; and
   an elastic sealing member is disposed annularly on an opposite side of whichever mated recess portion of said first mated recess portion and said second mated recess portion said refrigerant passage has said opening from said first inner wall surface so as to be held between an end surface of said center frame and an end surface of whichever bracket of said first bracket and said second bracket faces said mated recess portion;
   wherein said refrigerant passage is formed so as to have a cavity shape that does not have an undercut portion in an axial direction, said refrigerant passage is formed inside said center frame so as to have the opening on both said first mated recess portion and said second mated recess portion; and
   wherein said refrigerant passage comprises:
   a C-shaped first passage that has an opening on said first mated recess portion and that extends circumferentially;
   a C-shaped second passage that has an opening on said second mated recess portion, that extends circumferentially, and that is disposed so as to line up with said first passage so as to be separated axially; and
   a communicating passage that communicates axially between first end portions of said first passage and said second passage,
   said refrigerant passage being configured such that said refrigerant flows in from a second end portion of said first passage, flows through said first passage, said communicating channel, and said second passage, and is then discharged from a second end portion of said second passage.

2. The external cover-cooled rotary electric machine according to claim 1, wherein a gap is formed between a bottom surface of said second mated recess portion in a portion between said first end portion and said second end portion of said second passage and said second mated protrusion that is fitted together with said second mated recess portion so as to be mated.

3. The external cover-cooled rotary electric machine according to claim 1, wherein a plurality of rib portions are respectively disposed on an outer circumferential surface of said center frame at a uniform angular pitch circumferentially so as to extend axially from a first axial end to a second axial end.

4. An external cover-cooled rotary electric machine casing comprising:
- a first bracket;
- a second bracket; and
- a center frame that is held and fastened between end surfaces of said first bracket and said second bracket from two axial ends, said external cover-cooled rotary electric machine casing performing cooling by making a refrigerant flow through said center frame, wherein:

said center frame is formed into a tubular body that has a cylindrical inner circumferential surface;

a first mated recess portion and a second mated recess portion are formed annularly on each of two axial end surfaces of said center frame by a cutting process such that a first inner wall surface that is selected from an inner circumferential inner wall surface and an outer circumferential inner wall surface is formed into a mated surface;

a refrigerant passage through which said refrigerant is made to flow annularly along the center frame is formed inside said center frame so as to have an opening on at least one of said first mated recess portion and said second mated recess portion;

a first mated protrusion and a second mated protrusion are disposed so as to project annularly from respective end surfaces of said first bracket and said second bracket by a cutting process such that a first wall surface that is selected from an inner circumferential wall surface and an outer circumferential wall surface that fits together with said first inner wall surface so as to be mated is formed into a mated surface;

said center frame is fastened to said first bracket and said second bracket by said first mated protrusion and said second mated protrusion being fitted together with said first mated recess portion and said second mated recess portion so as to be mated; and an elastic sealing member is disposed annularly on an opposite side of whichever mated recess portion of said first mated recess portion and said second mated recess portion said refrigerant passage has said opening from said first inner wall surface so as to be held between an end surface of said center frame and an end surface of whichever bracket of said first bracket and said second bracket faces said mated recess portion;

wherein said refrigerant passage is formed so as to have a cavity shape that does not have an undercut portion in an axial direction, said refrigerant passage is formed inside said center frame so as to have the opening on both said first mated recess portion and said second mated recess portion; and wherein said refrigerant passage comprises:
- a C-shaped first passage that has an opening on said first mated recess portion and that extends circumferentially;
- a C-shaped second passage that has an opening on said second mated recess portion, that extends circumferentially, and that is disposed so as to line up with said first passage so as to be separated axially; and
- a communicating passage that communicates axially between first end portions of said first passage and said second passage, said refrigerant passage being configured such that said refrigerant flows in from a second end portion of said first passage, flows through said first passage, said communicating channel, and said second passage, and is then discharged from a second end portion of said second passage.

5. The external cover-cooled rotary electric machine casing according to claim 4, wherein a gap is formed between a bottom surface of said second mated recess portion in a portion between said first end portion and said second end portion of said second passage and said second mated protrusion that is fitted together with said second mated recess portion so as to be mated.

6. The external cover-cooled rotary electric machine casing according to claim 4, wherein a plurality of rib portions are respectively disposed on an outer circumferential surface of said center frame at a uniform angular pitch circumferentially so as to extend axially from a first axial end to a second axial end.

* * * * *